United States Patent [19]

Schoefberger

[11] 4,083,840
[45] Apr. 11, 1978

[54] DISAZO DYES HAVING A 6-AMINO OR SUBSTITUTED TRIAZINYLAMINO-1-HYDROXYNAPHTHALENE-3-SULFONIC ACID COUPLING COMPONENT RADICAL

[75] Inventor: Georg Schoefberger, Basel, Switzerland

[73] Assignee: Sandoz Ltd., Basel, Switzerland

[21] Appl. No.: 678,105

[22] Filed: Apr. 19, 1976

[30] Foreign Application Priority Data

Apr. 24, 1975  Switzerland .................. 5277/75

[51] Int. Cl.² .............. C09B 31/14; C09B 31/08; D06P 1/06; D06P 3/32
[52] U.S. Cl. .................. 260/153; 165/165; 260/187; 260/190; 260/191
[58] Field of Search ............................... 260/153

[56] References Cited

U.S. PATENT DOCUMENTS

| | | | |
|---|---|---|---|
| 2,722,527 | 11/1955 | Wehrli et al. .................. | 260/153 |
| 3,072,454 | 1/1963 | Long et al. .................. | 260/153 X |
| 3,165,506 | 1/1965 | Gunst .................. | 260/153 |
| 3,169,953 | 2/1965 | Gunst .................. | 260/153 |
| 3,340,247 | 9/1967 | Riat et al. .................. | 260/153 |

*Primary Examiner*—Floyd D. Higel
*Attorney, Agent, or Firm*—Gerald D. Sharkin; Richard E. Vila; Melvyn M. Kassenoff

[57] ABSTRACT

Disclosed are compounds of the formula,

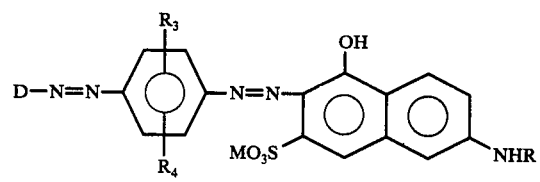

or wherein D is,

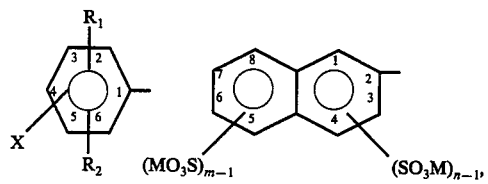

X is —COOM or —SO₃M, $R_1$ and $R_2$, independently, are hydrogen, halogen, $C_{1-3}$alkyl or $C_{1-3}$alkoxy, $m$ is 1, 2 or 3, and, when 3, the two sulpho groups are other than on adjacent carbon atoms, $n$ is 1 or 2, with the proviso that the sum of $n + m$ is 3 or 4, $R_3$ is hydrogen, $C_{1-3}$alkyl or $C_{1-3}$alkoxy, $R_4$ is hydrogen or $C_{1-3}$alkyl, $R_3$ and $R_4$, when both other than hydrogen, being in para position relative to each other, R is hydrogen or,

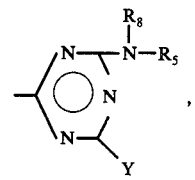

it being hydrogen only when D is,

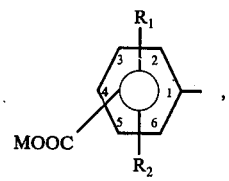

in which the —COOM group is m- or p- to the azo linkage, $R_5$ is —CHR₆—CHR₆—O-(CHR₇CH₂O)$_p$H, either both $R_6$'s are hydrogen, or one of the $R_6$'s is hydrogen, the other methyl or ethyl, $R_7$ is hydrogen, methyl or ethyl, $R_8$ is hydrogen, $C_{1-6}$alkyl or —CHR₆—CHR₆—O-(CHR₇CH₂O)$_q$H, Y is —NR₉R₁₀ or —N(R₁₁)—CHR₆—CHR₆—O-(CHR₇CH₂O)$_r$H, $R_9$ and $R_{10}$, independently, are hydrogen or $C_{1-6}$alkyl, preferably both not being simultaneously tertiary alkyl, $R_{11}$ is hydrogen, $C_{1-6}$alkyl or —CHR₆—CHR₆O-(CHR₇CH₂)$_t$H, $p, q, r$ and $t$, independently, are 0, 1, 2 or 3, and M is hydrogen or a non-chromophoric cation, their production and use in the dyeing of paper and leather, particularly the former, optionally in the form of concentrated liquid or powder or granulate dyeing preparations. The compounds have good solubility in cold water, substantivity and pH stability and produce dyeings having notable fastness to light and resistance to bleeding.

17 Claims, No Drawings

DISAZO DYES HAVING A 6-AMINO OR SUBSTITUTED TRIAZINYLAMINO-1-HYDROXYNAPHTHALENE-3-SULFONIC ACID COUPLING COMPONENT RADICAL

IMPROVEMENTS IN OR RELATING TO ORGANIC COMPOUNDS

The invention relates to disazo compounds. The invention provides compounds of formula I,

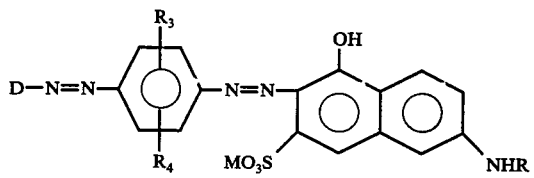

wherein D is a radical (a) or (b),

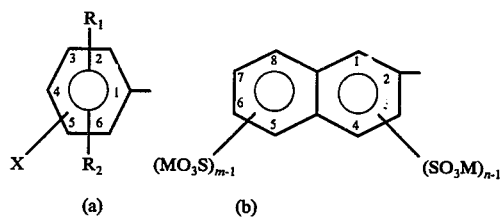

X is —COOM or —$SO_3M$, $R_1$ and $R_2$, independently, are hydrogen, halogen, $C_{1-3}$alkyl or $C_{1-3}$alkoxy, m is 1, 2 or 3, and, when 3, the two sulpho groups are other than on adjacent carbon atoms, n is 1 or 2, with the proviso that the sum of n + m is 3 or 4, $R_3$ is hydrogen, $C_{1-3}$alkyl or $C_{1-3}$alkoxy, $R_4$ is hydrogen or $C_{1-3}$alkyl, $R_3$ and $R_4$, when both other than hydrogen, being in PARA position relative to each other, R is hydrogen or a radical (c),

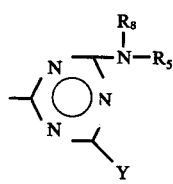

it being hydrogen only when D is a radical (a'),

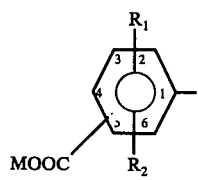

in which the —COOM group is m- or p- to the azo linkage, $R_5$ is —$CHR_6$—$CHR_6$—O—$(CHR_7CH_2O)_p$—H, either both $R_6$'s are hydrogen, or one of the $R_6$'s is hydrogen, the other methyl or ethyl, $R_7$ is hydrogen, methyl or ethyl, $R_8$ is hydrogen, $C_{1-6}$alkyl or —$CHR_6$—$CHR_6$—O—$(CHR_7CH_2O)_q$—H, Y is —$NR_9R_{10}$ or —$N(R_{11})$—$CHR_6$—$CHR_6$—O—$(CHR_7CH_2O)_r$—H, $R_9$ and $R_{10}$, independently, are hydrogen or $C_{1-6}$alkyl, preferably both not being simultaneously tertiary alkyl, $R_{11}$ is hydrogen, $C_{1-6}$alkyl or —$CHR_6$—$CHR_6$—O—$(CHR_7CH_2O)_t$—H, p, q, r and t, independently, are 0, 1, 2 or 3, and M is hydrogen or a non-chromophoric cation.

The invention also provides a process for the production of compounds of formula I, characterised by (a). coupling a diazotised amine of formula II,

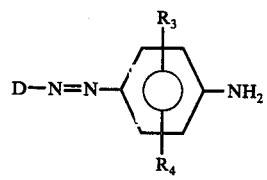

with a coupling component of formula III,

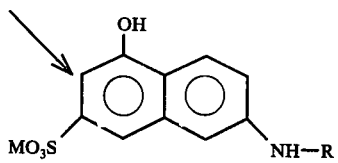

(b). obtaining a compound of formula I, in which D is a radical (a') and R is hydrogen, by saponifying a compound of formula IV

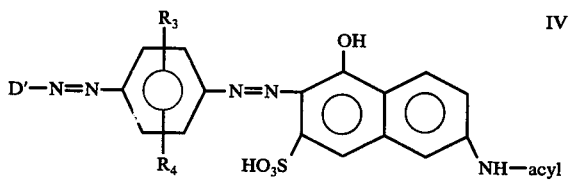

where D' is a radical (a'), and acyl is preferably a $C_{1-4}$alkylcarbonyl radical, or (c). obtaining a compound of formula I, in which R is a radical (c), by reacting a cyanurohalide with a compound of formula V,

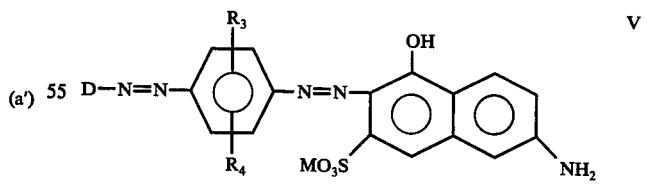

with a compound $HNR_5R_8$ and with a compound HY, in any desired order, the mol ratio of cyanuric halide: compound V: $HNR_5R_8$: HY preferably being 1:1:1:1.

The above processes may be carried out in conventional manner.

Thus, the coupling reaction in process (a) is conveniently carried out at a pH of 5 to 9, when R is H, and at 4–6 when R is a radical (c), a suitable temperature being from 0° to 30° C.

Process (b) is conveniently carried out in weakly alkaline media at 70° to 90° C.

Where, in process (c), the cyanurohalide is first reacted with a compound V, such is preferably carried out under weakly acid conditions, e.g. pH 5-6, at a temperature of 0°-20° C, the following reactions with the compounds $HNR_5R_8$ and HY, in either order, preferably being at a pH of 6-8, the first reaction at 40°-60° C, the second at 80°-100° C.

Where, in process (c), the cyanurohalide is first reacted with a compound $HNR_5R_8$, such is preferably commenced at 0°-20° C at a pH of 5-6 and completed at 50° C at neutral pH. Subsequent reaction with compound HY is conveniently carried out at 50°-70° C and with compound V at 80°-100° C, preferably 95°-100° C.

The compounds of formulae II to V are either known or may be obtained from available starting materials in conventional manner.

The compounds of formula III, wherein R is a radical (c), are new and form a further aspect of the present invention. They may be obtained by reacting a cyanurohalide with a) J-acid, b) a compound $HNR_5R_8$ and c) a compound HY in any desired order. Such reactions may be carried out in analogy to process c). in conventional manner.

The resulting compounds of formula I may be isolated and purified in conventional manner.

In the compounds of formula I, where $R_1$ or $R_2$ signifies halogen, such may be chlorine or bromine, preferably chlorine; where alkyl, such preferably is of 1 or 2 carbon atoms, and where alkoxy, such is preferably of 1 or 2 carbon atoms.

$R_1$ is preferably $R_1'$, i.e. hydrogen, chlorine, methyl, methoxy or ethoxy, more preferably $R_1''$, i.e. hydrogen, methyl or methoxy and most preferably $R_1'''$, i.e. hydrogen or methyl.

$R_2$ is preferably $R_2'$, i.e. hydrogen, chlorine or methyl, more preferably $R_2''$, i.e. hydrogen or methyl, most preferably hydrogen.

X is preferably —$SO_3M$.

When the X bearing phenyl ring is substituted by a single further substituent ($R_1$ or $R_2$) and said substituent is meta to the group X, then the preferred positions occupied by X and said substituent are the 2- and 4-positions. Where said substituent is ortho or para to the group X, then X is preferably in the 3, 4- or 5 position, examples of particular arrangements being X in the 5-position, the further substituent in the 2-position, and X in the 4-position, the further substituent in the 3-position.

When the X bearing phenyl ring is substituted by two further substituents ($R_1$ and $R_2$), X is preferably in position 4 or 5 and said further substituents in positions 2,5 or 2,4, respectively.

When in radical (a') the —COOM group is in para position to the azo linkage (4-position) and the phenyl ring substituted by a single further substituent, said further substituent may be in ortho or meta position to the —COOM group. Where two further substituents are borne by said phenyl ring, said two substituents are preferably in positions 2 and 5.

When in radical (a') the —COOM group is in meta position to the azo linkage (3- or 5 position), and the phenyl ring is substituted by a single further substituent, said further substituent is preferably either para to the —COOM group or para to the azo linkage. Where two further substituents are borne by said phenyl ring, such are preferably in positions 2 and 4, the —COOM group being in position 5.

Where the naphthyl ring (b) bears a single sulpho group, such group may, for example, be in position 5, 6, 7 or 8, preferably position 5 or 6. Where the naphthyl ring bears two sulpho groups, such groups may, for example, be in positions 3,6; 3,7; 4,8; 5,7 or 6,8, of which positions 3,6; 4,8 and 6,8 are preferred.

Where R is a radical (c), D is preferably a radical (a).

When $R_3$ is alkyl, it is preferably methyl, and when alkoxy, preferably methoxy or ethoxy. When $R_4$ is alkyl, it is preferably methyl.

$R_3$ is preferably $R_3'$, i.e. hydrogen, methyl, methoxy or ethoxy.

$R_4$ is preferably $R_4'$, i.e. hydrogen or methyl.

Most preferably $R_3$ and $R_4$ are both hydrogen.

$R_6$ and $R_7$ are preferably $R_6'$ and $R_7'$, i.e., independently, hydrogen or methyl.

$p$, $q$, $r$ and $t$ are preferably $p'$, $q'$, $r'$ and $t'$, i.e., independently, 0 or 1.

$R_5$ is preferably $R_5'$, i.e. —$CHR_6'CHR_6$-$O$—($CHR_7'CH_2O$)$_p$H, more preferably $R_5''$, i.e. —$CH_2CH_2O$—($CH_2CH_2O$)$_p$H.

When $R_8$ is alkyl, such is preferably $C_{1-4}$alkyl, more preferably $C_{1-2}$alkyl and most preferably methyl. When $R_8$ is —$CHR_6CHR_6O$—($CHR_7CH_2O$)$_q$H, $q$ is most preferably O and $R_6$ more preferably $R_6'$ and most preferably hydrogen.

$R_8$ is preferably $R_8'$, i.e., when $p$ or $p'$ is O, hydrogen or —$CHR_6'CHR_6'OH$ or, when $p$ or $p'$ is 1, hydrogen; more preferably $R_8''$, i.e., when $p$ or $p'$ is O, hydrogen or —$CH_2CH_2OH$ or, when $p$ or $p'$ is 1, hydrogen.

When $R_9$ or $R_{10}$ is alkyl, such is preferably $C_{1-4}$alkyl, more preferably $C_{1-2}$alkyl.

$R_9$ and $R_{10}$ are preferably $R_9'$ and $R_{10}'$, i.e., independently, hydrogen, methyl or ethyl.

When $R_{11}$ is alkyl, such is preferably $C_{1-4}$alkyl, more preferably $C_{1-2}$alkyl and most preferably methyl. When $R_{11}$ is —$CHR_6CHR_6O$—($CHR_7CH_2O$)$_t$H, $t$ therein is most preferably O and $R_6$ preferably $R_6'$, is most preferably hydrogen.

$R_{11}$, when $r$ or $r'$ is O, is preferably $R_{11}'$, i.e. hydrogen or —$CHR_6'CHR_6'OH$, more preferably $R_{11}''$, i.e. hydrogen or —$CH_2CH_2OH$. $R_{11}$, when $r$ or $r'$ is 1, is preferably hydrogen.

When Y is —$NR_{11}CHR_6$—$CHR_6O$—($CHR_7CH_2O$)$_r$H, it is preferably —$NR_{11}'$—$CHR_6'CHR_6'OH$ or —$NHCHR_6'CHR_6'O$—$CHR_7'CH_2OH$.

Y is preferably Y', i.e. —$NR_9'R_{10}'$, —$NR_{11}'CHR_6'CHR_6'OH$ or —$NH$—$CHR_6'CHR_6$-$O$—$CHR_7'CH_2OH$, more preferably Y'', i.e. —$NH_2$ or —$NR_{11}''$—$CH_2CH_2OH$.

Especially preferred compounds of the invention are those in which either —$NR_8R_5$ and Y are identical or in which Y is —$NH_2$ and —$NR_8R_5$ is —$NR_8''R_5''$.

The exact nature of any cation as M is not critical, provided such is non-chromophoric, and any cation is conveniently one conventional in the anionic dye art, to which the present invention relates. As particular examples of cations may be given the alkali metal cations (sodium, potassium and lithium), the unsubstituted ammonium cation, and alkyl and hydroxyalkyl substituted ammonium cations, in which the alkyl radicals are preferably of 1 to 3 carbon atoms and the hydroxyalkyl radicals preferably of 2 to 4 carbon atoms, e.g. the tetramethylammonium, triethylammonium and mono-, di-, and tri-ethanolammonium cations. Such ammonium and substituted ammonium cations are conveniently represented by the formula $N^+(R_x)_4$ where the $R_x$'s, independently, are hydrogen, $C_{1-4}$alkyl or $C_{2-4}$, preferably $C_{2-3}$, hydroxyalkyl, provided at least one $R_x$ is hydrogen when the others are hydroxyalkyl. From the point of view of production, the alkali metal cations, particularly the sodium cation, are the preferred significances of M.

As a first preferred class of compounds provided by the invention may be given the compounds of formula Ia,

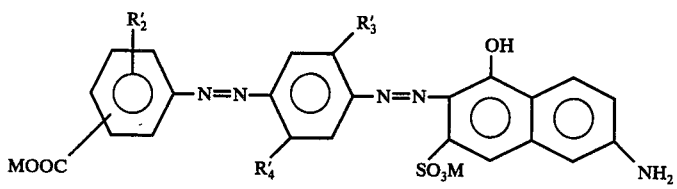

wherein the —COOM group is m or p to the azo linkage and $R_2'$, $R_3'$, $R_4'$, M and the preferred significances thereof are as defined above, the preferred relative positions of $R_2'$ and —COOM also being as given above.

As a second preferred class of compounds provided by the invention may be given the compounds of formula Ib,

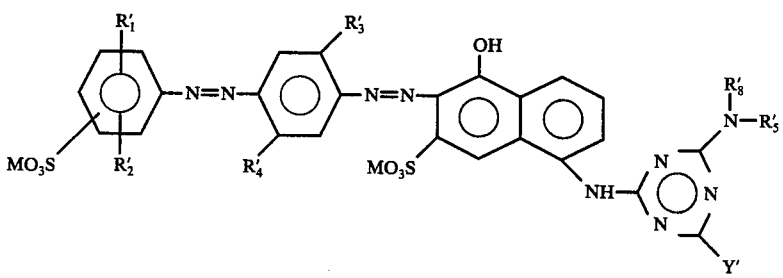

in which $R_1'$, $R_2'$, $R_3'$, $R_4'$, $R_5'$, $R_8'$, Y' and M are as defined above.

The preferred significances of each variable and the preferred relative positions of $R_1'$, $R_2'$ and —$SO_3M$ are as set forth above. Preferred compounds of formula Ib include those wherein —$NR_5'R_8'$ and Y' are identical as well as those wherein Y' is —$NH_2$, $R_5'$ is —$CH_2CH_2$—$(CH_2CH_2O)_p$—H and $R_8'$ is hydrogen or —$CH_2CH_2OH$.

Of the compounds of formula Ib, the compounds of formula Ib' are particularly preferred,

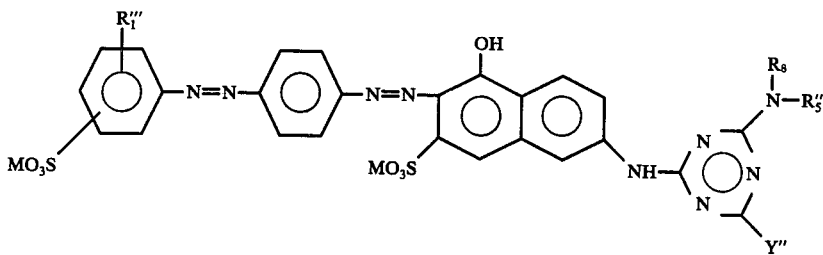

in which $R_1'''$, $R_5''$, $R_8''$, Y'' and M, are as defined above. The preferred relative positions of $R_1'''$ and —$SO_3M$ are as set forth above. The preferred compounds of formula Ib' are those wherein —$NR_5''R_8''$ and Y'' are identical and those wherein Y'' is —$NH_2$.

The compounds provided by the invention are useful for dyeing cellulosic substrates, particularly for dyeing paper. They are also useful for dyeing leather.

Paper may be dyed either in the stock or after sheet formation, sheet paper being dyed either prior to or after sizing.

The compounds of the invention may be used as such or, preferably, in liquid or solid dye preparation form. When dyeing paper in the stock, they may be added directly to the stock, without prior dissolution, in powder or granule form without substantially impairing the brilliance of the dyeing or reducing the dyestuff yield.

Liquid dye preparations of the compounds of the invention preferably take the form of concentrated aqueous preparations containing 100 parts by weight of dyestuff, 0–20 parts by weight of a salt, such as sodium chloride, 250–800 parts by weight of water and 50–500 parts by weight of urea, the amount of urea in the preparations being at most 40% by weight. Such preparations show good stability and storage qualities.

Solid dye preparations of the compounds of the invention preferably take the form of powder or granulate preparations, the average grain size in the granulate preparations preferably being at least 20 μ. Such preparations suitably contain 100 parts by weight of dyestuff, 1–50 parts by weight of a salt, suitably the salt employed in salting out the dyestuff e.g. a chloride or sulphate of the cation M, such as sodium chloride or sulphate or monoethanolammonium chloride, and 0–200 parts by weight of a standardising agent, the preparations having a water content of 0–15%. The granulate preparations are suitably prepared by spray drying of corresponding aqueous solutions. The standardising agent is for the purpose of standardising the depths of dyeing as between different dyestuffs and may be any inert solid diluent, organic or inorganic, examples being phosphates, carbohydrates, dextrin, glauber's salt, soda and the like.

The compounds of the invention have good water solubility, their solubility in cold water being particularly notable. They have good substantivity, do not give mottled effects, show good stability over a wide pH range and have little tendency to produce so-called two-sided effects when dyeing paper.

The compounds wherein D is a radical (a') and R is hydrogen have particularly notable insensitivity to pre-sizing, i.e. when rosin size and alum are added to the paper pulp before addition of dyestuff, there is no loss of brilliance or dyestuff yield.

The compounds of formula I, in which R is a radical (c), give dyeings of particularly notable light fastness, any fading after extended periods being tone-in-tone. Their insensitivity to pre-sizing is also good.

The compounds of the invention may be used in the dyeing of paper up to the dye saturation point of the substrate. The dyeings obtained are red to violet in shade and show good resistance to bleeding, e.g. when contacted with water, milk, fruit juices, sweetened mineral waters and alcohol. Particularly high resistance to bleeding can be obtained by the use of cationic fixing agents.

The following Examples, in which all parts and percentages are by weight and the temperatures in degrees centigrade, illustrate the invention.

EXAMPLE 1 (process a)

27.7 parts of 4-amino-1,1'-azobenzene-4'-sulphonic acid are dissolved at 50° in 750 parts of water and 15 parts of 30% sodium hydroxide solution. 7 parts of sodium nitrite are then added to this and the solution is allowed to flow into a preparation of 30 parts of 30% hydrochloric acid and 100 parts of water over the course of 30 minutes. After stirring for 4 hours, diazotisation is complete; the excess nitrous acid is decomposed using amidosulphonic acid.

43.6 parts of 2-(5'-hydroxy-7'-sulphonaphthylamino-2')-4,6-bis(2''-hydroxyethylamino)-1,3,5-triazine are dissolved in 200 parts of water and 15 parts of 30% sodium hydroxide solution, and 10 parts of sodium bicarbonate are added to this solution. Subsequently, the diazo suspension is passed into this and stirred until coupling has ended. Then, 300 parts of sodium chloride are added and stirred overnight. The separated dyestuff corresponds in the form of the free acid to the formula

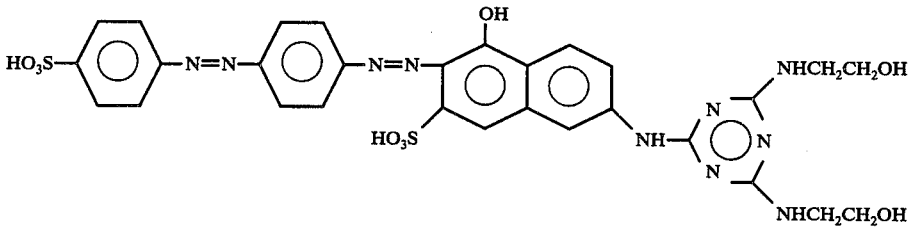

The press-cake resulting may be processed directly to form solid or liquid preparations. After drying, a dark powder is obtained, which dissolves in a red shade in water and dyes paper in pure red shades.

The coupling component 2-(5'hydroxy-7'-sulphonaphthylamino-2')4,6-bis(2''-hydroxyethylamino)-1,3,5-triazine may be produced in the following manner:

18.5 parts of 2,4,6-trichloro-1,3,5-triazine (cyanuric chloride) are stirred in 50 parts of water and 50 parts of ice to form a fine, homogeneous suspension. Over the course of 1 hour, a solution of 24 parts of 2-amino-5-hydroxynaphthalene-7-sulphonic acid, 200 parts of water and 15 parts of 30% sodium hydroxide solution are passed into this suspension. The reaction mixture is stirred for 3 hours at 0°-5° and during this time the pH is kept between 2.5 and 3.5 by adding in drops a 15% sodium carbonate solution. As soon as the pH remains constant, 12 parts of monoethanolamine are added to it and it is heated to 50°-55° and kept at this temperature for 2 hours. Subsequently, heating continues up to 95°. As soon as the temperature of 80° has been reached, one begins to add in drops the 15% sodium carbonate solution, so that the pH lies between 6.5 and 7. When condensation has ended, the reaction solution is made mineral acid with hydrochloric acid and the separated product is filtered off.

EXAMPLE 2 (process c)

18.5 parts of cyanuric chloride are stirred in 50 parts of water and 50 parts of ice to form a fine, homogeneous suspension. Over the course of 2 hours, at 0°-5°, a neutral solution of 52.7 parts of the aminodisazo compound which is obtained by coupling diazotised 4-amino-1,1'-azobenzene-4'-sulphonic acid with 2-amino-5-hydroxynapthalene-7-sulphonic acid in a neutral medium, and 500 parts of water are added in drops to this suspension. At the same time, the pH is kept at between 5 and 6 by sprinkling in sodium bicarbonate. As soon as the reaction is complete, the reaction mixture is heated to 45° and 12 parts of monoethanolamine are added. After stirring for 2 hours, 17 parts of sodium bicarbonate are added and it is heated to 95° and kept at this temperature for 4 hours. The disazo dyestuff formed is precipitated with common salt. The same product as in example 1 is obtained.

EXAMPLE 3 (process c)

18.5 parts of cyanuric chloride are dissolved in 100 parts of acetone. This solution is added in drops to a preparation consisting of 200 parts of water, 200 parts of ice and 21 parts of diethanolamine. The reaction mixture is stirred for 2 hours at 5°-10°. Subsequently, it is heated to 50° and kept at this temperature for 2 hours. At the same time, 11 parts of sodium carbonate are added in the form of a 10% solution, so that a pH of 6.5 – 7 is maintained. It is then allowed to cool to 20° and the separated condensation product is filtered off.

54 parts of the aminodisazo compound which is obtained by coupling diazotised 4-amino-2-methyl-1,1'-azobenzene-4'-sulphonic acid with 2-amino-5-hydroxynaphthalene-7-sulphonic acid in a neutral medium are dissolved in 600 parts of water with a sodium hydroxide solution so as to become neutral, then 9 parts of sodium carbonate and the condensation product of cyanuric chloride and diethanolamine are added. This is heated to 98° and stirred at this temperature for 2 hours. The disazo dyestuff obtained, which corresponds in the form of the free acid to the formula

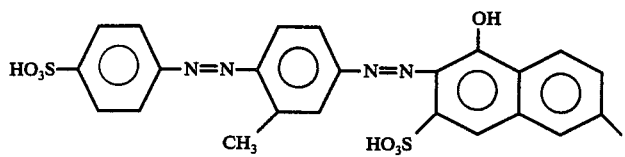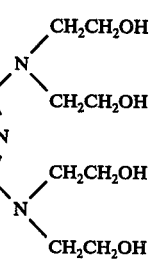

is precipitated with sodium chloride and filtered off. It dyes paper in red shades.

EXAMPLE 4 (process a)

10.5 parts of diethanolamine are added to a suspension of 18.5 parts of cyanuric chloride in 50 parts of water and 50 parts of ice, and they are stirred for 3 hours at 0°–5°, whereby the pH is kept at 5 by sprinkling in sodium bicarbonate. Then, 4.5 parts of ethylamine are added as a 70% aqueous solution and they are heated over the course of 2 hours to 70°. At the same time, one ensures that the pH lies between 6.5 and 7.5 by sprinkling in sodium bicarbonate. The suspension obtained is cooled to 20° and the condensation product is filtered off.

24 parts of 2-amino-5-hydroxynaphthalene-7-sulphonic acid are dissolved in 200 parts of water and 15 parts of 30% sodium hydroxide solution, and 9 parts of sodium bicarbonate and the condensation product of cyanuric chloride, diethanolamine and ethylamine are added. The mixture is stirred for 3 hours at 95°–100° and is subsequently made mineral acid with hydrochloric acid. After cooling, it is filtered.

The 2-(5'-hydroxy-7'-sulphonaphthylamino-2')-4-(2''-hydroxyethylamino)-6-ethylamino-1,3,5-triazine obtained is dissolved in 250 parts of water and 15 parts of 30% sodium hydroxide solution, and at a pH of 4 – 5, it is coupled with the diazo compound obtained by diazotising 30.5 parts of 4-amino-2',5'-dimethyl-1,1'-azobenzene-4'-sulphonic acid, to form the disazo dyestuff of the formula

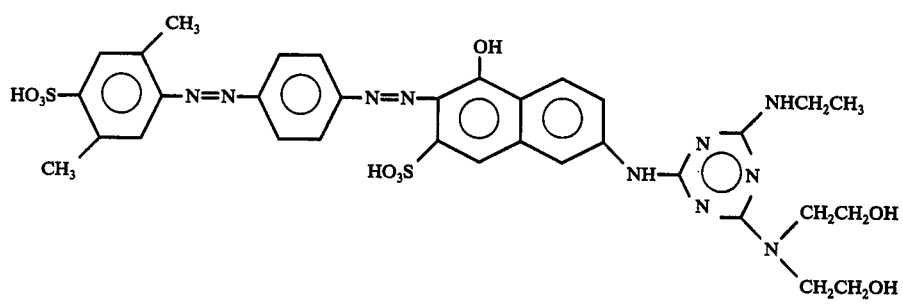

The dyestuff is precipitated by adding sodium chloride. It dyes paper in red shades.

In the following table are listed further disazo dyestuffs which may be produced by analogy to any one of the previous examples, the symbols A, Z and Y having the definitions given in the table. The dyeings obtained on paper are red to bluish red.

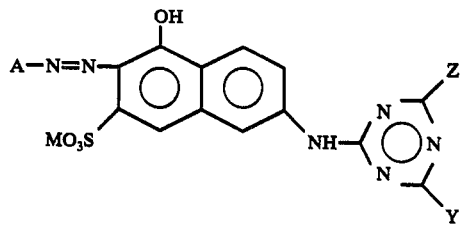

| Ex. No. | A | Z | Y |
|---|---|---|---|
| 5 | HO$_3$S—⟨O⟩—N=N—⟨O⟩— | —N(CH$_2$CH$_2$OH)(CH$_2$CH$_2$OH) | —N(CH$_2$CH$_2$OH)(CH$_2$CH$_2$OH) |
| 6 | " | —NHCH$_2$CH$_2$OCH$_2$CH$_2$OH | —NHCH$_2$CH$_2$OCH$_2$CH$_2$OH |
| 7 | " | " | —NHCH$_2$CH$_2$OH |
| 8 | " | —NHCH$_2$CHOH(CH$_3$) | —NHCH$_2$CHOH(CH$_3$) |
| 9 | " | —NHCH$_2$CH$_2$OH | —NH$_2$ |

-continued

| Ex. No. | A | Z | Y |
|---|---|---|---|
| 10 | " | −N(CH₂CH₂OH)(CH₂CH₂OH) | −N(C₂H₅)(C₂H₅) |
| 11 | " | −N(CH₂CH₂OH)(CH₃) | −N(CH₂CH₂OH)(CH₃) |
| 12 | " | −N(CH₂CH₂OH)(CH₂CH₂OH) | −NHCH₂CH₂OH |
| 13 | " | " | −NH₂ |
| 14 | " | " | −NH−CH₃ |
| 15 | " | " | −NH−C₂H₅ |
| 16 | " | −NHCH(CH₃)CH₂OH | −NHCH(CH₃)CH₂OH |
| 17 | HO₃S−(C₆H₃-CH₃)−N=N−(C₆H₄)− | −NHCH₂CH₂OH | −NHCH₂CH₂OH |
| 18 | " | " | " |
| 19 | " | −N(CH₂CH₂OH)(CH₂CH₂OH) | −NH−CH₃ |
| 20 | " | " | −N(CH₂CH₂OH)(CH₂CH₂OH) |
| 21 | HO₃S−(C₆H₃-CH₃)−N=N−(C₆H₃-CH₃)− | " | " |
| 22 | " | " | −NHCH₂CH₂OH |
| 23 | HO₃S−(C₆H₂(CH₃)₂)−N=N−(C₆H₄)− | " | −NH₂ |
| 24 | " | −NHCH₂CH₂OH | −NHCH₂CH₂OH |
| 25 | " | −N(CH₂CH₂OH)(CH₂CH₂OH) | −N(CH₂CH₂OH)(CH₂CH₂OH) |
| 26 | " | −NHCH₂CH₂OH | −NH₂ |
| 27 | " | " | −NH−CH₃ |
| 28 | " | −NHCH₂CH₂OCH₂CH₂OH | −NHCH₂CH₂OCH₂CH₂OH |
| 29 | " | −NHCH₂CH₂OH | −N(CH₂CH₂OH)(CH₂CH₂OH) |

-continued

| Ex. No. | A | Z | Y |
|---|---|---|---|
| 30 | 2-methyl-5-sulfo-phenyl-N=N-phenyl (CH₃ at 2, HO₃S at 5) | $-N(CH_2CH_2OH)_2$ | " |
| 31 | " | $-NHCH_2CH_2OH$ | $-NHCH_2CH_2OH$ |
| 32 | 4-HOOC-phenyl-N=N-phenyl | " | " |
| 33 | " | $-N(CH_2CH_2OH)_2$ | $-N(CH_2CH_2OH)_2$ |
| 34 | " | $-NHCH_2CH_2OCH_2CH_2OH$ | $-NHCH_2CH_2OCH_2CH_2OH$ |
| 35 | 2-SO₃H-4-methyl-phenyl-N=N-phenyl | $-NHCH_2CH_2OH$ | $-NHCH_2CH_2OH$ |
| 36 | " | " | $-NH_2$ |
| 37 | " | $-N(CH_2CH_2OH)_2$ | $-NH_2$ |
| 38 | " | " | $-NH-CH_3$ |
| 39 | " | " | $-NHCH_2CH_2OH$ |
| 40 | " | $-NHCH_2CH_2OCH_2CH_2OH$ | $-NHCH_2CH_2OCH_2CH_2OH$ |
| 41 | " | $-N(CH_2CH_2OH)_2$ | $-N(CH_2CH_2OH)_2$ |
| 42 | 2-SO₃H-phenyl-N=N-phenyl | " | " |
| 43 | " | $-NHCH_2CH_2OH$ | $-NHCH_2CH_2OH$ |
| 44 | " | " | $-NH_2$ |
| 45 | " | $-NHCH_2CH_2OCH_2CH_2OH$ | $-NHCH_2CH_2OCH_2CH_2OH$ |
| 46 | 2-SO₃H-phenyl-N=N-(3-CH₃-phenyl) | $-NHCH_2CH_2OH$ | $-NHCH_2CH_2OH$ |
| 47 | 3-CH₃-4-H₃C-5-HO₃S-phenyl-N=N-phenyl | " | " |
| 48 | 4-HO₃S-phenyl-N=N-(3-OCH₃-phenyl) | " | " |
| 49 | " | $-N(CH_2CH_2OH)_2$ | $-N(CH_2CH_2OH)_2$ |

-continued
| Ex. No. | A | Z | Y |
|---|---|---|---|
| 50 | 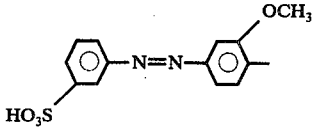 | " | " |
| 51 | " | —NHCH$_2$CH$_2$OH | —NHCH$_2$CH$_2$OH |
| 52 | 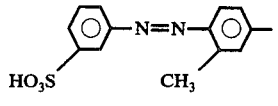 | " | " |
| 53 | " | —N(CH$_2$CH$_2$OH)$_2$ | —N(CH$_2$CH$_2$OH)$_2$ |
| 54 | 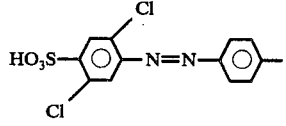 | —NHCH$_2$CH$_2$OH | —NHCH$_2$CH$_2$OH |
| 55 | 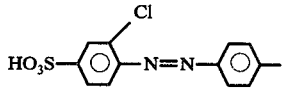 | " | " |
| 56 | 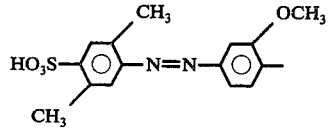 | " | " |
| 57 | 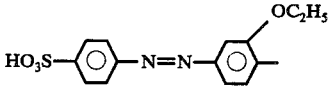 | " | " |
| 58 | 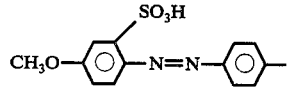 | —N(CH$_2$CH$_2$OH)$_2$ | —N(CH$_2$CH$_2$OH)$_2$ |
| 59 | 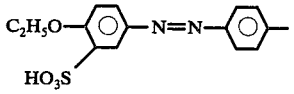 | —NHCH$_2$CH$_2$OH | —NHCH$_2$CH$_2$OH |
| 60 | 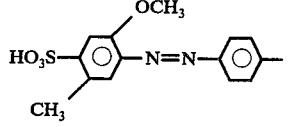 | " | " |
| 61 | " | —NHCH$_2$CH$_2$OCH$_2$CH$_2$OH | —N(CH$_2$CH$_2$OH)$_2$ |
| 62 | " | —N(CH$_2$CH$_2$OH)$_2$ | " |
| 63 | 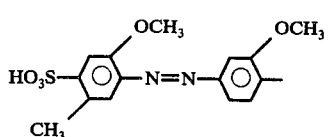 | " | " |

-continued

| Ex. No. | A | Z | Y |
|---|---|---|---|
| 64 | " | —NHCH$_2$CH$_2$OH | —NHCH$_2$CH$_2$OH |
| 65 | ![naphthalene with two SO$_3$H groups, N=N, phenyl] | " | —NH$_2$ |
| 66 | " | —N(CH$_2$CH$_2$OH)$_2$ | —N(CH$_2$CH$_2$OH)$_2$ |
| 67 | HO$_3$S-naphthalene(SO$_3$H)-N=N-phenyl | " | " |
| 68 | " | —NHCH$_2$CH$_2$OH | —NHCH$_2$CH$_2$OH |
| 69 | HO$_3$S-naphthalene-N=N-phenyl | " | —NH$_2$ |
| 70 | " | —N(CH$_2$CH$_2$OH)$_2$ | —N(CH$_2$CH$_2$OH)$_2$ |

EXAMPLE 71 (process a)

24.1 Parts of 4-amino-1,1'-azobenzene-4'-carboxylic acid are dissolved at 60° in 500 parts of water and 15 parts of 30% sodium hydroxide solution. 7 Parts of sodium nitrite are then added to this solution and the whole allowed to cool to room temperature, whereby the sodium salt of 4-amino-1,1'-azobenzene-4'-carboxylic acid is partially precipitated. This suspension is allowed to flow into a well stirred pre-preparation of parts 30% hydrochloric acid and 50 parts of ice over the course of 30 minutes. Any excess nitrous acid is decomposed using amidosulphonic acid, following which the pH of the diazo suspension is kept at 5 with sodium bicarbonate. The diazo suspension so prepared is added to a solution of 24 parts of 2-amino-5-hydroxynaphthalene-7-sulphonic acid, 200 parts of water and 15 parts of 30% sodium hydroxide solution. A 15% sodium carbonate solution is simultaneously added dropwise so as to maintain the pH in the range of 7 to 8. After stirring for one hour the pH is increased to 11 by adding 10 parts of 30% sodium hydroxide solution, the whole heated to 60° and the dyestuff precipitated using sodium chloride. The product is filtered and dried. The separated dyestuff which corresponds in the form of the free acid to the formula

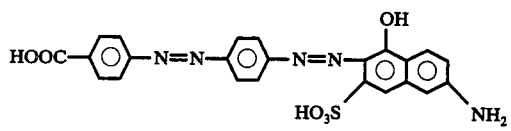

is a grey powder which dissolves in a red shade in water and dyes paper in brilliant red shades.

EXAMPLE 72 (process a)

13.7 Parts of 3-aminobenzoic acid are stirred in 100 parts of water, 100 parts of ice and 25 parts 30% hydrochloric acid to form a fine, homogenous suspension, following diazotisation with 7 parts of sodium nitrite, dissolved in 25 parts of water. After the excess nitrous acid is decomposed using aminosulphonic acid, 18.7 parts of aniline-ω-methane sulfonic acid are added to the diazo solution and the pH is kept at 7 by sprinkling in sodium carbonate. After stirring for 2 hours, coupling is completed. The dyestuff solution is heated to 80°, 40 parts 30% sodium hydroxide solution added and the temperature held at 80° for 2 hours. The dyestuff solution is neutralised by adding 30% hydrochloric acid, then 100 parts sodium chloride are added and the whole stirred overnight at room temperature. The separated 4-amino-1,1'-azobenzene-3'-carboxylic acid in the form of its sodium salt is filtered and dissolved in 300 parts of water. To the solution are added 7 parts of sodium nitrite and the whole added dropwise at 0°–5° with thorough stirring into a mixture of 20 parts 30% hydrochloric acid and 30 parts of ice. After stirring for one hour the excess nitrous acid is decomposed using amidosulphonic acid and the pH of the diazo suspension raised to 6 by sprinkling in sodium bicarbonate. The diazo suspension is allowed to flow into a solution of 24 parts of 2-amino-5-hydroxynaphthalene-7-sulphonic acid, 200 parts of water, 15 parts sodium bicarbonate. After 2 hours the suspension is heated to 60°, the pH raised to 10 with 30% sodium hydroxide solution and the dyestuff precipitated by adding sodium chloride.

The separated dyestuff, which corresponds in the form of the free acid to the formula

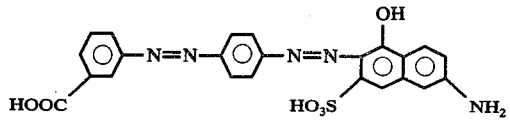

is filtered and dried. A dark powder which dissolves in a red shade in water and dyes paper in pure red shades is obtained.

EXAMPLE 73 (process b)

24.1 Parts of 4-amino-1,1'-azobenzene-3'-carboxylic acid are diazotised according to the procedure of Example 72. 28.1 Parts of 2-acetylamino-5-hydroxynaphthalene-7-sulphonic acid are added to the diazo suspension, whereafter the mixture is neutralised by dropwise addition of 15% sodium carbonate solution. As soon as the coupling is completed, 60 parts of sodium hydroxide solution are added and the mixture is heated to 85° and held at this temperature for 3 hours. After this time cleavage of the acetyl groups is completed. The mixture is neutralised with 30% hydrochloric acid, allowed to cool under stirring and filtered off, whereby the same dyestuff as in Example 72 is obtained. Further disazo dyestuffs which may be produced analogously to Examples 71, 72 and 73, are listed in the following Table. They correspond to the formula

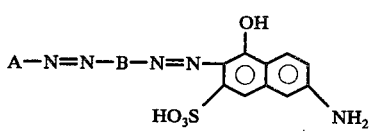

wherein the meaning of A and B is given in the Table. In column I the shade of dyeing on paper is given; $a$ = bluish red, $b$ = rubine, $c$ = bordeaux and $d$ = red.

| Ex. No. | A | B | I |
|---|---|---|---|
| 74 | HOOC—⌬— | —⌬—CH₃ | a |
| 75 | " | —⌬—OCH₃ (2-OCH₃) | b |
| 76 | ⌬—HOOC (3-) | —⌬—CH₃ | c |
| 77 | HOOC—⌬—CH₃ | —⌬— | d |
| 78 | ⌬—Cl / HOOC | " | d |
| 79 | HOOC—⌬—Cl | " | d |
| 80 | Cl—⌬—HOOC | —⌬—CH₃ | a |

EXAMPLE 81 (process a)

The dyestuff, which corresponds in the form of the free acid to the formula

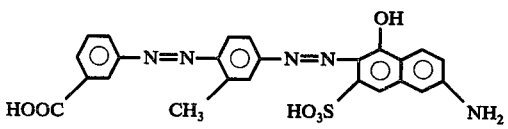

can be produced as follows:

13.7 Parts of 3-aminobenzoic acid are diazotised in analogous manner to Example 72 and 11 parts of m-toluidine added to the obtained diazo solution. Over the course of 4 hours, 10 parts of sodium acetate are sprinkled in and the solution stirred overnight. The amino azo dyestuff partially separates. The suspension is heated to 50°, 5 parts of 30% hydrochloric acid are added and then filtered after 15 minutes.

The obtained product is entered into 500 parts of water and 30% sodium hydroxide solution is added thereto until a neutral solution is formed. 7 Parts of sodium nitrite are added and the solution allowed to flow at 0°–5° into a mixture of 25 parts 30% hydrochloric acid and 40 parts of ice.

The procedure for the preparation of the diazo suspension and the coupling with 24 parts of 2-amino-5-hydroxynaphthalene-7-sulphonic acid and isolation of the end product is given in Example 72.

The obtained dyestuff paste is further dissolved at 60° in 800 parts of water. 30 Parts of 30% hydrochloric acid are added dropwise, whereby the dyestuff separates in the form of the free acid. The dyestuff paste can be used for the production of dyestuff preparations in solid and liquid forms.

EXAMPLES 82 and 83

80 Parts of the disodium salt of the dyestuff of Example 1 or 72 are entered at room temperature, in the form of the presscake resulting from the final filtration, into a solution of 20 parts of sodium sulphate and 300 parts of water, and they are stirred to form a homogeneous suspension. After spray drying, reddish-brown granules are obtained, which dissolve very easily in water and dye paper in brilliant red shades. The dyestuffs of the other examples may be similarly processed into granules.

EXAMPLE 84

120 Parts of the dyestuff of Example 1 are entered into a solution of 200 parts of urea and 600 parts of water, and they are dissolved by heating to 60°. The solution is filtered until clear by adding a filtration agent. The filtrate is allowed to cool to room temperature and is adjusted to 1000 parts with water. A dyestuff solution is obtained, which is stable for several months at room temperature and may be used directly or after dilution with water for dyeing paper.

Similarly, the dyestuffs from the other example may be processed to form such stable dyestuff preparations.

EXAMPLE 85

200 Parts of the dyestuff of Example 1 are stirred homogeneously in the form of the free dyestuff acid into 500 parts of water and are dissolved at 40° by adding 58 parts of diethanolamine and 100 parts of urea. The solution is filtered until clear by adding a filtration agent. The filtrate is allowed to cool to room temperature and is adjusted to 1000 parts with water to form a stable dyestuff solution. Similar results are obtained using the dyestuff of Example 84.

Instead of diethanolamine, monoethanolamine, triethanolamine, ammonia, tetramethylammonium hydroxide, lithium hydroxide or lithium carbonate may also be used.

EXAMPLE 86

120 Parts of the dyestuff of Example 81 in the form of the obtained paste of the dyestuff acid with 150 parts urea and 600 parts of water are stirred to a fine homogeneous dispersion, which dispersion is heated to 60° and the pH set to 7.5 to 8.5 by addition of 50 parts of diethanolamine, whereby the dyestuff goes into solution. After filtration using a filter aid the dyestuff solution is increased to 1000 parts with water. The dyestuff solution can be stored for several months at room temperature and can be used in concentrated or diluted form for the dyeing of paper.

The dyestuff acids of Examples 71 to 80 are also equally suitable for the production of stable liquid dyestuff preparations.

When in Examples 85 and 86 neutralisation is carried out, using in place of diethanolamine, monoethanolamine, triethanol amine, diglycol amine, polyglycol amine, ammonia, tetramethylammonium hydroxide, lithium hydroxide or lithiumcarbonate, liquid dyestuff preparations with similarly good properties are obtained.

DYEING FORMULA A

70 Parts of chemically bleached sulphite cellulose (from conifer wood) and 30 parts of chemically bleached sulphite cellulose (from birchwood) are ground in 2000 parts of water in a Hollander. 0.2 Parts of the dyestuff preparation described in Example 82 or 83 are sprinkled into this pulp. After 20 minutes mixing, paper is produced from this pulp. The absorbent paper obtained in this manner is dyed red. The waste water is practically colourless.

DYEING FORMULA B 0.5 Parts of the dyestuff powder from Example 1 are dissolved in 100 parts of hot water and the solution is cooled to room temperature. This solution is added to 100 parts of chemically bleached sulphite cellulose, which have been ground in a Hollander with 2000 parts of water. After mixing for 15 minutes, sizing takes place in the usual manner using rosin size and aluminum sulphate. The paper produced has a red shade of average intensity and has good wet fastness. Similar results are obtained using the dyestuff of Example 71.

DYEING FORMULA C

By using in dyeing formula A, instead of 0.2 parts of the dyestuff preparation of Example 82, 1 part of the liquid preparation of Example 84, a dyed paper is obtained which is of comparable shade and has similarly good properties.

DYEING FORMULA D

When in place of the 0.2 parts of the dyestuff preparation of Example 83, 1.0 part of the liquid preparation of Example 86 is employed, a bluish red dyed paper with similarly good properties is obtained.

DYEING FORMULA E

An absorbent length of paper which is unsized is drawn through a dyestuff solution of the following composition at 40°–50°:

0.5 parts of the dyestuff preparation of Example 82
0.5 parts of starch
99.0 parts of water.

The excess dyestuff solution is pressed out through two rollers. The dried length of paper is dyed red.

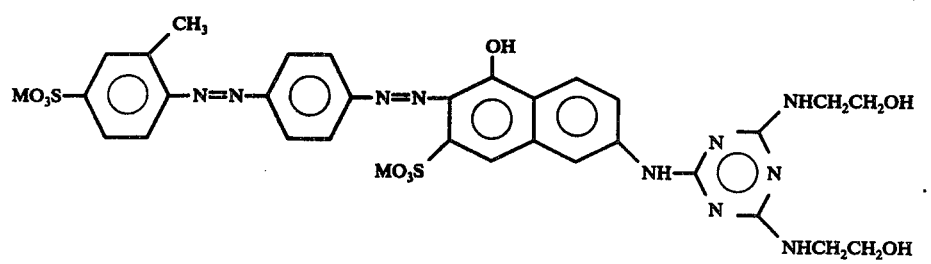

What is claimed is:

1. A compound of the formula wherein
$R_1'$ is hydrogen, chloro, methyl, methoxy or ethoxy,
$R_2'$ is hydrogen, chloro or methyl,
$R_3'$ is hydrogen, methyl, methoxy or ethoxy,
$R_4'$ is hydrogen or methyl,
$R_5'$ is $-CHR_6'CHR_6'O + CHR_7'CH_2O +_{p'}H$, wherein $p'$ is 0 or 1,
$R_8'$ is hydrogen or $-CHR_6'CHR_6'OH$, with the proviso that $R_8'$ must be hydrogen when $p'$ is 1,
$Y'$ is $-NR_9'R_{10}'$, $-NR_{11}'CHR_6'CHR_6'OH$ or $-NHCHR_6'CHR_6'OCHR_7'CH_2OH$,
wherein each
$R_6'$ is hydrogen or methyl, with the proviso that at least one $R_6'$ on each $R_6'$-containing group is hydrogen,
each
$R_7'$ is hydrogen or methyl,
each of
$R_9'$ and $R_{10}'$ is independently hydrogen, methyl or ethyl, and
$R_{11}'$ is hydrogen or $-CHR_6'CHR_6'OH$, wherein $R_6'$ is as defined above, and
each
M is hydrogen or a non-chromophoric cation.

2. A compound according to claim 1 wherein each
M is hydrogen, lithium, sodium, potassium or $N^{\oplus}(R_x)_4$,
wherein each
$R_x$ is independently hydrogen, $C_{1-4}$alkyl or $C_{2-4}$hydroxyalkyl, with the proviso that at least one $R_x$ is hydrogen when the others are $C_{2-4}$hydroxyalkyl.

3. A compound according to claim 2 wherein each M is lithium, sodium or potassium.

4. A compound according to claim 3 wherein each M is sodium.

5. A compound according to claim 1 wherein Y' and

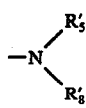

are identical.

6. A compound according to claim 1 wherein
$R_5'$ is $-CH_2CH_2O-(CH_2CH_2O)_{p'}H$, wherein p' is 0 or 1,
$R_8'$ is hydrogen or $-CH_2CH_2OH$, with the proviso that $R_8'$ must be hydrogen when p' is 1, and
Y' is $-NH_2$.

7. A compound according to claim 1 having the formula $R_8''$ is hydrogen or $-CH_2CH_2OH$, with the proviso that $R_8''$ must be hydrogen when p' is 1,
Y'' is $-NH_2$ or $-NR_{11}''-CH_2CH_2OH$, wherein $R_{11}''$ is hydrogen or $-CH_2CH_2OH$, and each M is hydrogen or a non-chromophoric cation.

8. A compound according to claim 7 wherein Y'' and

are identical.

9. A compound according to claim 7 wherein Y'' is $-NH_2$.

10. The compound according to claim 1 having the formula

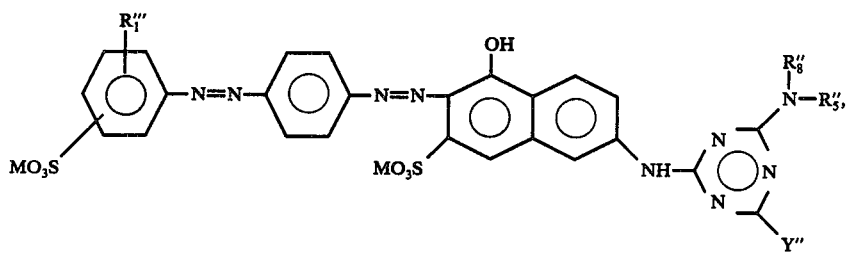

wherein
$R_1'''$ is hydrogen or methyl,

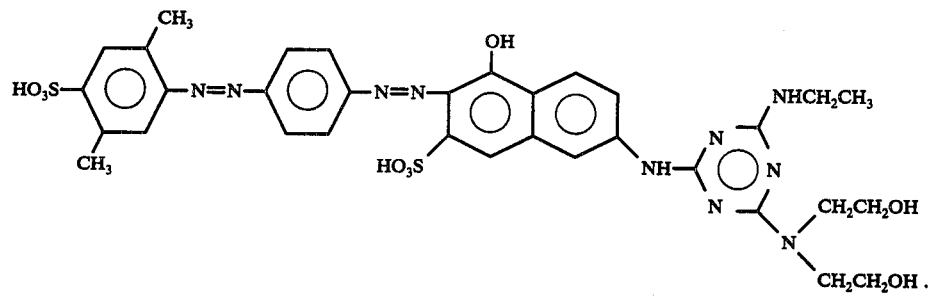

11. A compound according to claim 8 having the formula

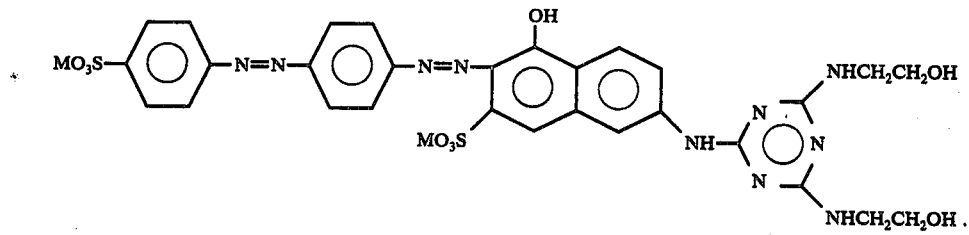

$R_5''$ is $-CH_2CH_2O-(CH_2CH_2O)_{p'}H$, wherein p' is 0 or 1,

12. The compound according to claim 11 having the formula

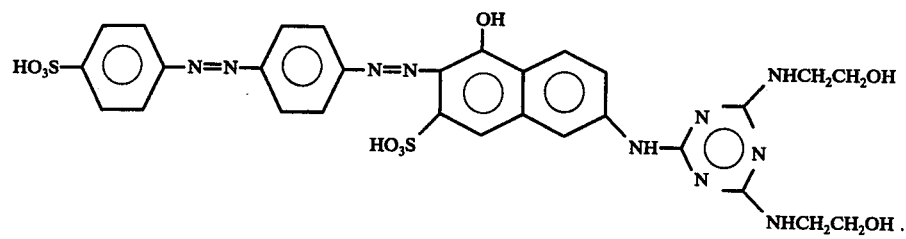
13. A compound according to claim 8 having the formula
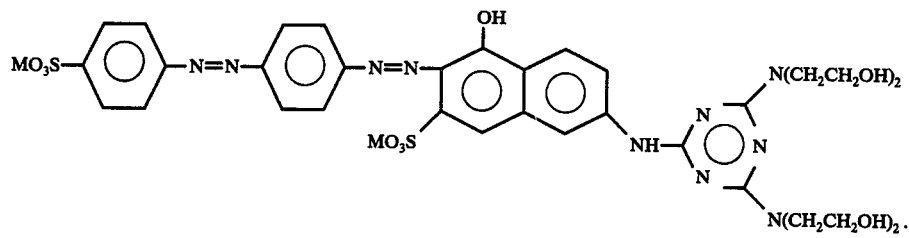
14. The compound according to claim 13 having the formula
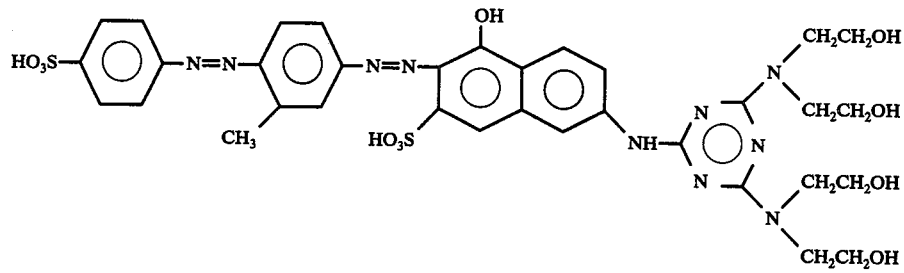
15. A compound according to claim 5 having the formula
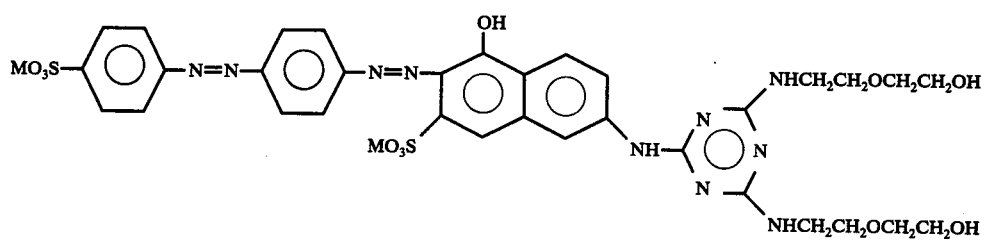
16. A compound according to claim 9 having the formula
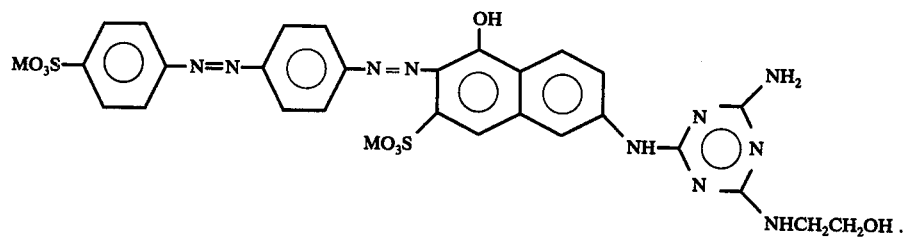
17. A compound according to claim 8 having the formula